US011100593B2

(12) United States Patent
Ayachitula et al.

(10) Patent No.: US 11,100,593 B2
(45) Date of Patent: Aug. 24, 2021

(54) USING SOCIAL NETWORK DATA TO DETECT AND QUANTIFY UNAUTHORIZED CONSUMPTION OF CONTENT

(71) Applicant: International Business Machines Corporation, Armonk, NY (US)

(72) Inventors: Naga A. Ayachitula, Elmsford, NY (US); Mahesh Gajwani, Jersey City, NJ (US); Ashish Kundu, Elmsford, NY (US); Abhishek Malvankar, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 15/471,477

(22) Filed: Mar. 28, 2017

(65) Prior Publication Data

US 2018/0285984 A1    Oct. 4, 2018

(51) Int. Cl.
*G06Q 50/00* (2012.01)
*G06Q 30/02* (2012.01)
*G06F 21/10* (2013.01)
*G06N 7/00* (2006.01)

(52) U.S. Cl.
CPC .............. *G06Q 50/01* (2013.01); *G06F 21/10* (2013.01); *G06N 7/005* (2013.01); *G06Q 30/0207* (2013.01); *G06F 2221/2101* (2013.01); *G06Q 2220/18* (2013.01)

(58) Field of Classification Search
CPC .............. G06Q 50/01; G06Q 30/0207; G06Q 2220/18; G06F 21/10; G06F 2221/2101; G06N 7/005
See application file for complete search history.

(56) References Cited

U.S. PATENT DOCUMENTS

| 8,311,950 | B1 | 11/2012 | Kunal et al. |
| 8,601,596 | B2 | 12/2013 | Wu et al. |
| 9,215,243 | B2 | 12/2015 | Bommireddipalli et al. |
| 9,386,089 | B2 | 7/2016 | Doganaksoy et al. |
| 9,699,042 | B2* | 7/2017 | Krynski ............... H04L 43/04 |
| 2012/0110678 | A1* | 5/2012 | Kumble ............... G06F 21/10 726/28 |

(Continued)

FOREIGN PATENT DOCUMENTS

CN          103942254 A       7/2014

OTHER PUBLICATIONS

Efrat Fenigson, "How Social Media Accelerates Piracy," http://blog.viaccess-orca.com/industry/how-social-media-accelerates-piracy/, Oct. 31, 2015, 7 pages.

(Continued)

*Primary Examiner* — John W Hayes
*Assistant Examiner* — Arastoo (Ari) Shahabi
(74) *Attorney, Agent, or Firm* — Anthony Curro; Ryan, Mason & Lewis, LLP

(57) ABSTRACT

A method for utilizing data analytics to identify unauthorized consumption of content comprises obtaining social network activity data from one or more social networks. The obtained social network activity data is analyzed to identify one or more users involved with content associated with a content provider. A determination is made as to whether or not the one or more users are authorized to access the content based at least in part on the analysis.

20 Claims, 5 Drawing Sheets

(56) References Cited

U.S. PATENT DOCUMENTS

| | | | |
|---|---|---|---|
| 2012/0166533 A1* | 6/2012 | Rubinstein | G06Q 30/0224 |
| | | | 709/204 |
| 2014/0279614 A1 | 9/2014 | Lonstein et al. | |
| 2014/0325550 A1 | 10/2014 | Winograd et al. | |
| 2015/0081609 A1* | 3/2015 | Hande | G06Q 50/01 |
| | | | 706/46 |
| 2015/0170225 A1 | 6/2015 | Belleroche | |
| 2016/0253679 A1* | 9/2016 | Venkatraman | G06Q 30/0185 |
| | | | 705/310 |
| 2018/0068338 A1* | 3/2018 | Lewis | G06Q 30/0235 |

OTHER PUBLICATIONS

R. Larose et al., "Sharing or Piracy? An Exploration of Downloading Behavior," Journal of Computer-Mediated Communication, Nov. 2005, pp. 1-21, vol. 11, No. 1.

* cited by examiner

USING SOCIAL NETWORK DATA TO DETECT AND QUANTIFY UNAUTHORIZED CONSUMPTION OF CONTENT

BACKGROUND

The present invention relates to information processing systems, and more specifically to management of content consumption in such information processing systems.

Social networking platforms ("social networks"), such as Facebook®, Twitter®, etc., are online platforms used by people to communicate on the Internet. For example, people may use social networks to discuss their personal preferences, daily activities, etc. directly to either their connections or to the public. People may also use social networks to express their preferences indirectly. For example, someone may "like" a page on Facebook®, follow a person on Twitter®, etc. Such social network activity may include communications regarding content, such as movie, television and sports content.

Movie and television content providers, such as Netflix®, Amazon® and Hulu®, invest large sums of money in developing movie and television content. These content providers rely mainly on the legal or otherwise authorized consumption of content using approved content delivery networks (CDNs). However, piracy (e.g., illegal or otherwise unauthorized access to content) has become a major concern for content providers due to the loss of revenue attributed to providing free access to pirated content. Piracy may also impact sporting event content providers that rely on the legal consumption of sports content (e.g., television broadcasting) to generate revenue.

SUMMARY

Illustrative embodiments of the invention provide techniques that utilize data analytics to identify social media activity related to content associated with a content provider and to track user behavior associated with the content. Such data analytics may include, but are not limited to, machine learning (ML) and natural language processing (NLP) techniques. While illustrative embodiments are well-suited to quantify an amount users on social networks who may be involved in the unauthorized consumption of content (e.g., piracy), alternative embodiments may be implemented.

For example, in one illustrative embodiment, a computer-implemented method is provided for identifying unauthorized consumption of content. The method comprises obtaining social network activity data from one or more social networks. The obtained social network activity data is analyzed to identify one or more users involved with content associated with a content provider. A determination is made as to whether or not the one or more users are authorized to consume the content based at least in part on the analysis. The steps of the method are implemented by at least one processing device comprising a processor operatively coupled to a memory.

For example, in another illustrative embodiment, a computer program product to identify unauthorized consumption of content comprises a computer-readable storage medium for storing computer-readable program code which, when executed, causes a computer to perform the steps of: obtaining social network activity data from one or more social networks; analyzing the obtained social network activity data to identify one or more users involved with content associated with a content provider; and determining whether or not the one or more users are authorized to consume the content based at least in part on the analysis.

For example, in yet another illustrative embodiment, an apparatus to identify social network activity related to unauthorized content comprises at least one processing device comprising a processor operatively coupled to memory. The processing device is configured to: obtain social network activity data from one or more social networks; analyze the obtained social network activity data to identify one or more users involved with content associated with a content provider; and determine whether or not the one or more users are authorized to consume the content based at least in part on the analysis.

Other embodiments will be described in the following detailed description of embodiments, which is to be read in conjunction with the accompanying figures.

DETAILED DESCRIPTION

In illustrative embodiments, techniques are provided for social network data analysis. More particularly, illustrative embodiments provide data analytics techniques, such as ML and NLP techniques, to identify users who are consuming content without authorization (e.g., pirating content) based on social network activity. As will be explained, illustrative embodiments advantageously leverage communications on one or more social networks to identify such users in order to quantify piracy in order to, for example, perform risk assessment and control piracy.

More particularly, in one or more illustrative embodiments, social network users that are consuming content without authorization (e.g., consuming pirated content) are identified by analyzing social network data associated with social networks such as public social network communications and postings. Advantageously, this gives a content provider associated with content the ability to quantify a number of users on social networks who may be engaging in piracy of the content, as well as the ability to remedy the unauthorized consumption of the content by targeting the identified users with notifications that may include an offer to obtain authorized access to the content from the content provider at a reduced price.

Figure 1:
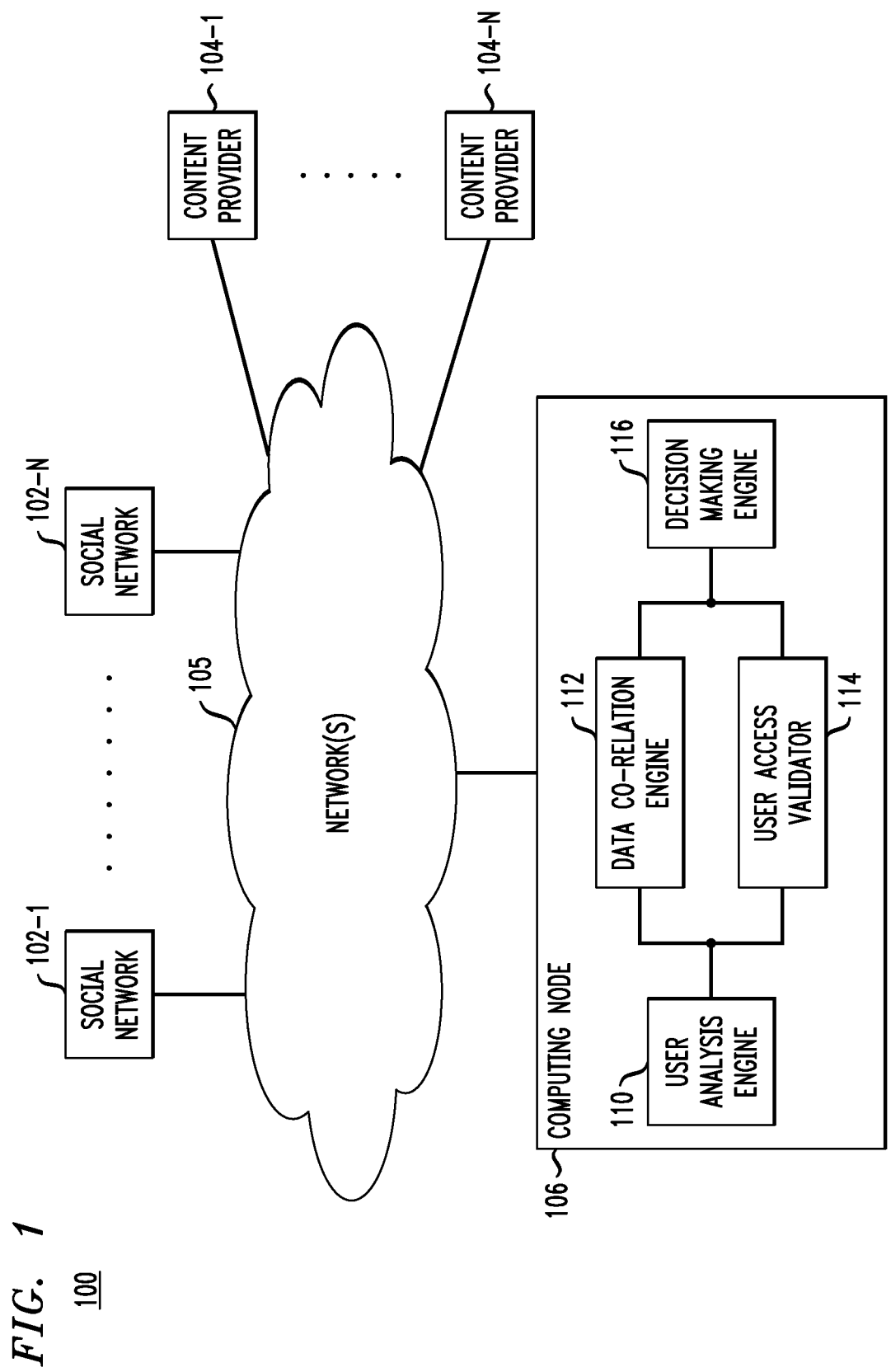
FIG. 1 depicts a computing platform for quantifying unauthorized content consumption, according to an embodiment of the invention.

FIG. 1 illustrates a computing platform 100 on which a piracy detection computational system can be implemented. As shown in FIG. 1, one or more communication networks 105 are shown as the mechanism for coupling one or more social networks 102-1 through 102-N, one or one or more content providers 104-1 through 104-N and at least one computing node 106. It is to be assumed that the one or more social networks 102-1 through 102-N are provided with access to data associated with the one or more content providers 104-1 through 104-N.

As is known in the art, a social network may be defined as a website or other application that enables users to communicate with one another by posting information, comments, messages, images, etc. Such information, comments, messages, images, etc. may be referred to generally as social network data. Examples of social network websites or applications include, but are not limited to, Facebook®, Twitter®, LinkedIn®, Instagram®, Snapchat® and Tumblr®. A user may have accounts among multiple social networks. Thus, user details (e.g., a user profile) may be mined by cross-referencing social networks associated with a user.

In one embodiment, the one or more content providers are associated with one or more respective content delivery networks (CDNs). As is known in the art, a CDN may refer to a network, such as a distributed network of servers, which delivers content to an end-user. Such content may include, for example, web objects (e.g., text, graphics and scripts), downloadable objects (e.g., media files, software and documents), applications, live streaming media and on-demand streaming media. A content provider may utilize CDNs to distribute and deliver its content to end-users having accounts (e.g., subscriptions) with the content provider. The content may be, for example, a television show, movie, live broadcast (e.g., sporting event), song, e-book, etc., and a content provider may be, for example, a media company, an online vendor, etc.

A user may have an account (e.g., subscription) with a content provider to receive authorized access to content provided by the content provider. Such information may be comprised within a data map. Thus, information from the data map may be used to determine whether a user is authorized to access certain content associated with a content provider.

As further shown, FIG. 1 illustrates component details of computing node 106. As shown, computing node 106 may include a user analysis engine 110, data co-relation engine 112, user access validator 114 and decision making engine 116. While functions of each component will be described in greater detail below, in general: the user analysis engine 110 analyzes social network activity data obtained from at least one social network in order to identify users involved with content associated with a content provider; data co-relation engine 112 co-relates mined user details with content provider data; user access validator 114 validates user access to the content being consumed by determining whether a given user has a valid account with the content provider based on the co-relation; and decision making engine 116 makes a determination as to whether or not the given user is authorized to consume the content.

In one embodiment, computing node 106 is further configured to quantify an amount of unauthorized consumption of the content. For example, computing node 106 may be configured to calculate a number of users consuming the content without authorization (e.g., quantifying a number of users pirating the content).

In one embodiment, computing node 106 is further configured to send a notification to the one or more users to remedy the unauthorized consumption of the content. The notification may be sent through the at least one social network. Such a notification may include an incentive to obtain authorized access to consume the content from the content provider. The incentive may include an offer (e.g., coupon or other discount mechanism) that may be used to gain authorized access to the content via the content provider. For example, the offer may be for an account or subscription to the content provider. Accordingly, users who are pirating content may be detected and subsequently targeted as potential customers in order to maximize revenue for the content provider.

Figure 2:
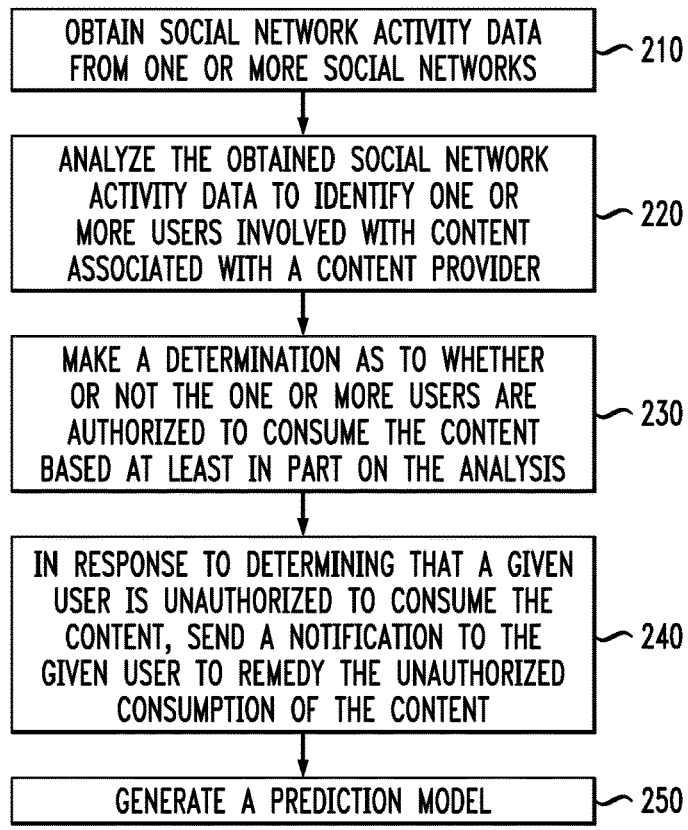
FIG. 2 depicts a flow chart illustrating an overview of a process for quantifying unauthorized content consumption, according to an embodiment of the invention.

With reference to FIG. 2, a flow diagram is provided illustrating an overview of a process 200 for identifying unauthorized content consumption by social network users.

At step 210, social network activity data is obtained from one or more social networks. The social network activity data may include, but is not limited to, shared posts, comments on shared posts, social media groups that the user is subscribed to, etc. In one embodiment, the obtained data is associated with information or communications that are publicly available (i.e., capable of being viewed by anyone using the platform). In one embodiment, the obtained data may be associated with information or communications that are privately available. For example, privately available data may include private messages sent between users of the one or more social networks. Privately available data may include geolocation data. For example, information regarding a location of users of a social network may indicate that the users are currently together or otherwise in close geographical proximity (even if the users do not "check in" or otherwise publicly post that they are currently together). A social network may, in its terms of service (ToS), indicate that the social network may utilize private data in accordance with the embodiments described herein.

At step 220, the obtained social network activity data is analyzed to identify one or more users involved with content associated with a content provider. In one embodiment, analyzing the obtained data at step 220 comprises tracking social network activity related to the content (e.g., public posts associated with the content). For example, the obtained social network activity data may include social network communications expressing views about the content, social network activity indicating that one or more users are consuming the content together, or social network activity indicating that one or more users are discussing the content. The social network activity may include a post that includes a given user and one or more other users "tagged" in the post, and thus the given user and the one or more other users are identified to be involved with content associated with a content provider. In one embodiment, the analysis at step 220 comprises determining one or more of a geo-location and a time at which the content is being accessed.

In one embodiment, analyzing the obtained social network activity data comprises performing a natural language processing (NLP) analysis. NLP analysis is performed to identify social network activity related to content, as discussed above in FIG. 2. The NLP analysis may be performed to detect sentiment and/or tone of a user with respect to the content. For example, a user may post "I will never watch show XYZ" or "Show XYZ is awesome!" The NLP analysis may determine that the user is discussing show XYZ, and may extract negative or positive sentiment from the communication. The NLP analysis may be performed by one or more classification algorithms. A classifier may be used, such as a naïve counting classifier, which can infer meaning for the obtained content, and avoid identifying users that have negation mentioned. In one embodiment, performing the NLP analysis comprises performing deep analytics on one or more of tone and level of interest. For example, distribution semantics techniques, such as latent semantic analysis (LSA), may be performed. As is known in the art, LSA is a technique that analyzes relationships between a set of documents and the terms they contain by producing a set of concepts related to the documents and terms. In one embodiment, performing the NLP analysis comprises utilizing relation extraction to detect and classify relations, such as semantic relations.

In one embodiment, analyzing the obtained social network activity data comprises creating a graph for the at least one social network. The graph depicts connections between users in the at least one social network. For example, the graph may comprise nodes representing the users in the social network, and edges representing respective connections between two users. The graph may be a probabilistic graph.

At step 230, a determination is made as to whether or not the one or more users are authorized to consume the content based at least in part on the analysis. In one embodiment, making the determination at step 230 comprises filtering the graph to remove any users who are determined to have authorization to consume the content. Further details regarding the filtering will be discussed below with reference to FIG. 3.

In one embodiment, the determination at step 230 comprises determining a degree of confidence that a given user is consuming content without authorization based on one or more confidence scores or probabilities associated with the given user. For example, if the given user has a valid account with the content provider, the given user may be assigned a score of "0," since the given user is guaranteed to have authorization to consume the content. If not, other scores may be taken into account, such as interest in the content, frequency of the posts shared on social networks, etc. Different scores or probabilities that may be computed in calculating the degree of confidence are, for example, the probability that the given user is talking about content, a probability that the given user is connected with another user having a valid profile or account with the content provider, a probability that the given user does not have an account, and a probability that the content is being broadcast legally. The probabilities may be computed using any probabilistic method in accordance with the embodiments described herein.

In one embodiment, the degree of confidence for a given user may be determined by comparing the one or more confidence scores of the given user to a threshold score. For example, if the threshold score is set at 0.5, then the given user is determined to have unauthorized access to the content, or is otherwise involved in piracy related to the content, if the given user has a score greater than 0.5. However, the threshold score may vary on a case-by-case basis.

In one embodiment, one or more ML techniques may be implemented in the determination of the degree of confidence.

In one embodiment, the determination at step 230 may be performed using geographic data indicating a geographic location of the given user. The geographic data may reduce the time it takes to make the determination performed at step 230. For example, if particular content is not available at the geographic location indicated by the geographic data, and the given user is consuming the content, then it may be deduced automatically that the given user does not have authorization to consume the content (e.g., the content has to have been pirated by the given user).

If it is determined at step 230 that a given user of the one or more users is authorized to consume the content, the given user is determined to not be committing piracy and thus no action is taken. However, if it determined at step 230 that the given user is consuming the content without authorization, then that user is determined to be committing piracy. The determination at step 230 may be performed to quantify a number of users involved in pirating content.

In one embodiment, at step 240, a notification may be sent to one or more users to remedy the unauthorized consumption of the content. The notification may include an offer to obtain authorized access to the content from a content provider. For example, the notification may include a coupon or other discount mechanism that may be used to subscribe to a content provider at a reduced price. That is, the notification need not be punitive or threatening, but may serve as an incentive to legally consume content by making it more affordable to gain access to the content from the content provider. This targeting of persons consuming pirated content on the Internet may lead to an increase in revenue for the content provider. The notification may be additionally or alternatively sent to users of one or more regions determined to contain a high percentage of users consuming the content without authorization. The region may be determined based on geo-location data from social network activity.

In one embodiment, a prediction model may be generated at step 250 to predict the likelihood that unauthorized consumption of content may occur in the future. For example, one or more regression techniques (e.g., linear regression) may be used in the generation of the prediction model. Categorization or bucketing of users may be performed using one or more clustering techniques (e.g., K-means).

Figure 3:
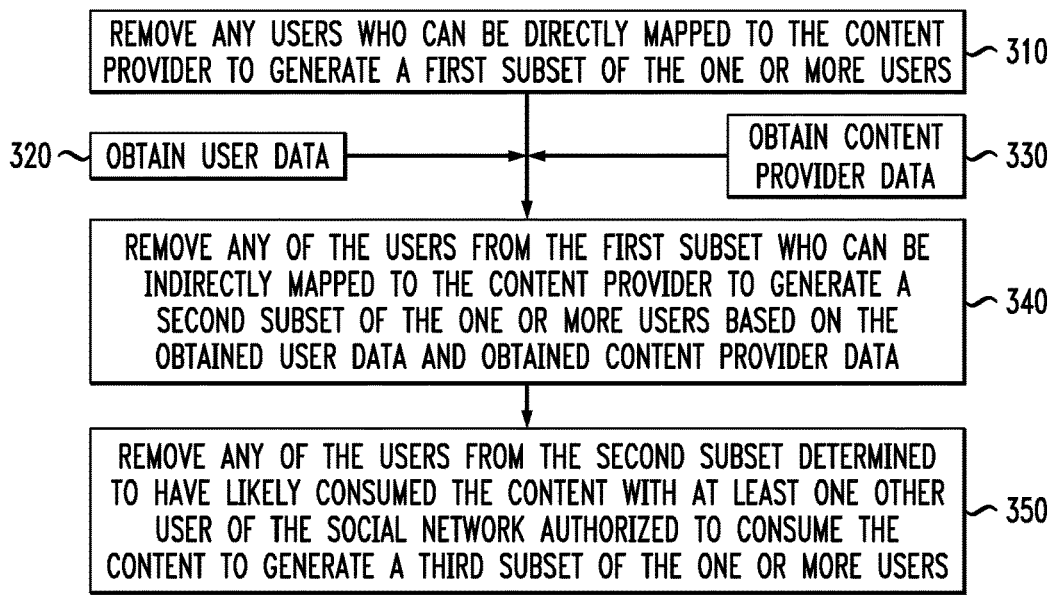
FIG. 3 depicts a flow chart illustrating an exemplary process for making a determination as to whether or not one or more users are authorized to consume content associated with a content provider.

With reference to FIG. 3, a flow chart is provided illustrating an exemplary process 400 for making a determination as to whether or not one or more users are authorized to consume content associated with a content provider.

At step 310, any users identified as being involved with content associated with a content provider who can be directly mapped to the content provider are removed to generate a first subset of the one or more users. For example, a given user is mapped to the content provider if the given user has a valid account with the content provider. In one embodiment, the users are removed from the graph of the at least one social network, as discussed in FIG. 2. In another embodiment, the users are removed from a suspicion list comprising a list of the one or more identified users.

The first subset comprises users who cannot be mapped to the content provider directly. However, this does not mean that all of the users in the first subset do not have a valid account with the content provider. At steps 320 and 330, user data and content provider data are obtained. In one embodiment, obtaining the user details comprises mining the user data from one or more social networks associated with the one or more users. The user data may include data associated with contact information for the user, such as name, address, e-mail address, etc. Data mining techniques are known in the art, and further details of such techniques will not be discussed herein. The content provider data may include a data map comprising information stored within a database associated with the content provider. Then, at step 340, any of the users from the first subset who can be indirectly mapped to the content provider are removed to generate a second subset of the one or more users based on the obtained user data and the obtained content provider data. In one embodiment, removing the users from the first subset comprises comparing the user data to the content provider data. The comparison may be performed by feeding the user data and the content provider data into a data co-relation engine.

At step 350, any of the users from the second subset determined to have likely consumed the content with at least one other user of the social network who can be mapped to the content provider are removed to generate a third subset of the one or more users. For example, the at least one other user of the social network may be a friend or family member that has a valid account with the content provider.

In one embodiment, step 350 comprises determining that the given user is associated with at least one other user in the social network who can be mapped to the content provider, and determining if the at least one user is mentioned in the social network activity of the given user (e.g., tagged in the post). If so, then the given user is removed, since watching the television show with someone who is authorized to watch the television show (e.g., has a valid account with the content provider) is not piracy.

If not, step 350 further comprises determining whether a given user is likely to have consumed the content with the at least one other user, public and/or private data may be leveraged to determine a likelihood that the given user is indeed capable of meeting the at least one other user who can be mapped to the content provider in the real world. For example, a "closeness" may be determined between the given user and the at least one other user in order to quantify the likelihood. The closeness may be determined by analyzing social network activity regarding past interactions between the given user and the at least one other user (e.g., identifying a post containing information associated with something they did in the real world together), exploiting private user location sharing or other geo-location data (e.g., if they were in the same location at the time the television show was airing, then they were likely watching the television show together), etc. For example, if a user posts that he or she is enjoying ice cream with another user at an ice cream shop, the information in this post may be used to determine a strong likelihood that these users are capable of meeting in the real world. In addition, the social network can also exploit private messaging data to determine if user watched the content. For example, the social network may analyze a private chat between the given user and the at least one other user on the social network talking about the television show. Determining a likelihood that two connected users are capable of meeting in the real world may add to the strength of connection between the two users.

In one embodiment, step 350 comprises identifying a connection type between the given user and the at least one other user. For example, it may be determined if the connection between the given user and the at least one other user is personal or professional. This determination may be made based on the social network through which they are connected (e.g., if the social network is personal in nature, such as Facebook®, or professional in nature, such as LinkedIn®). This information may be important since users who are connected personally are more likely to share access to content than those who are connected professionally.

In one embodiment, step 350 comprises determining a "distance" between the given user and the at least one other user. For example, the number of steps or hops between users in the social network graph may be calculated, which may indicate a strength of connection between the users. In one embodiment, step 350 comprises assigning weights to edges based on how well users are connected to each other.

After performing steps 310-350, the users who are remaining are those who cannot be personally mapped to the content provider, either directly or indirectly, and likely did not watch the content with another user (e.g., a friend or family member) who is authorized to consume the content. Thus, the remaining users are those who are likely to have consumed the content without authorization (e.g., pirated the content).

The embodiments described herein allow for the identification of users of social networks who are consuming content without authorization from a content provider. Consider the following user case describing an exemplary implementation of the embodiments described herein.

Assume that a social network has the ability to access user information associated with a content provider. Now, the social network and/or the content provider would like to know how many users on the social network are watching a particular television show without authorization (e.g., pirating the television show). All of the interactions on the social network that refer to the television show may be considered. Such interactions may include indicators of "liking" the television show, tags of the television show in a post, mentions of the television show in a post, etc.

First, users of the social network who are not talking about the show or who have posts suggesting that they are either not interested in the television show or haven't watched the television show are filtered out using NLP analysis. An example of a post suggesting that a user is not interested in the television show may be "Am I the only one who has never watched [the television show]?" In contrast, there may be users who have expressed their interest in the television show explicitly on the social network. An example of such a post may be "Shocked by the ending of the last episode of [the television show]!!!" All users who have indicated an interest in the television show in some way may be declared "suspect users."

Next, the suspect users who can be directly mapped to the content provider (e.g., have an account with the content provider) are filtered out, since such users have authorized access to watch the television show. At this point, the remaining suspect users are those that do not have an account with the content provider or otherwise cannot be directly mapped to the content provider.

In order to determine if the users can be indirectly mapped to the content provider, user profiles for each of the remaining suspect users are analyzed. For example, contact information of the remaining suspect users, such as phone numbers, e-mail addresses, etc. may be assigned to respective user profiles. The user profiles for the remaining suspect users may comprise contact information aggregated from multiple social networks, since users may use different contact information on different social networks (e.g., use different e-mail addresses to log into different social networks). An attempt is then made to map the user profiles of the remaining suspect users with the content provider data. Any of the remaining suspect users that can be mapped to the content provider based on their user profiles are then filtered and removed.

The remaining suspect users are those suspect users who cannot be mapped, either directly or indirectly, to the content provider. For a given one of these suspect users, it is determined if the given suspect user is associated with at least one other user in the social network who can be mapped to the content provider, such as close friends or family.

If it is determined that the given user is associated with at least one other user in the social network who can be mapped to the content provider, then it is determined if the at least one user is mentioned in the social network activity of the given user (e.g., tagged in the post). If so, then the given user is removed, since watching the television show with someone who is authorized to watch the television show is not considered to be piracy.

However, if the at least one user is not mentioned in the social network activity of the given user, the social network may leverage other public and/or private data to determine a likelihood that the given user is able to meet the at least one other user who can be mapped to the content provider in the real world. For example, a "closeness" may be determined in order to quantify the likelihood that the given user is able to meet the at least one other user who can be mapped to the content provider in the real world. The closeness may be determined by analyzing social network activity regarding past interactions between the given user and the at least one other user (e.g., identifying a post containing information associated with something they did in the real world together), exploiting private user location sharing or other geo-location data (e.g., if geo-location data indicates that the given user and the at least one other user were in same location at the time the television show was airing, then they were likely watching the television show together), etc. In addition, the social network can also exploit private messaging data to determine if user watched the content. For example, the social network may analyze a private chat between the given user and the at least one other user on the social network talking about the television show.

After removing those users who likely watched the television show with at least one other user who can be mapped to the content provider, the remaining users are those that watched the television show without authorization (e.g., pirated the television show), with a certain degree of confidence that they pirated the content. The degree of confidence may be determined for a given user by determining one or more scores. The one or more scores may include, but are not limited to, one or more of: (1) a score associated with the user profile of the given user mapping to the content provider; (2) a score associated with the NLP analysis on social network activity associated with the given user; (3) a score associated with a closeness of the given user with the other users on the social network who can be mapped to the content provider; and (4) a score associated with a confidence that the user can meet these other users in the real world. Once the one or more scores are obtained, they may be compared to at least one score threshold to determine the degree of confidence. The degree of confidence determination may be improved using machine learning technology, such as by training a machine learning module to vary the threshold and provide active learning upon receipt of new data.

The content provider may leverage the above information to quantify an amount of piracy of the television show and/or identify those users who are pirating the television show. Additionally, the content provider may send a notification to those users, from the content provider directly and/or through the social network, that includes an incentive to obtain authorized access to consume the content from the content provider. The incentive may include an offer to open an account with the content provider or to otherwise purchase authorized access to the content, such as with a coupon or other discount mechanism.

Figure 4:
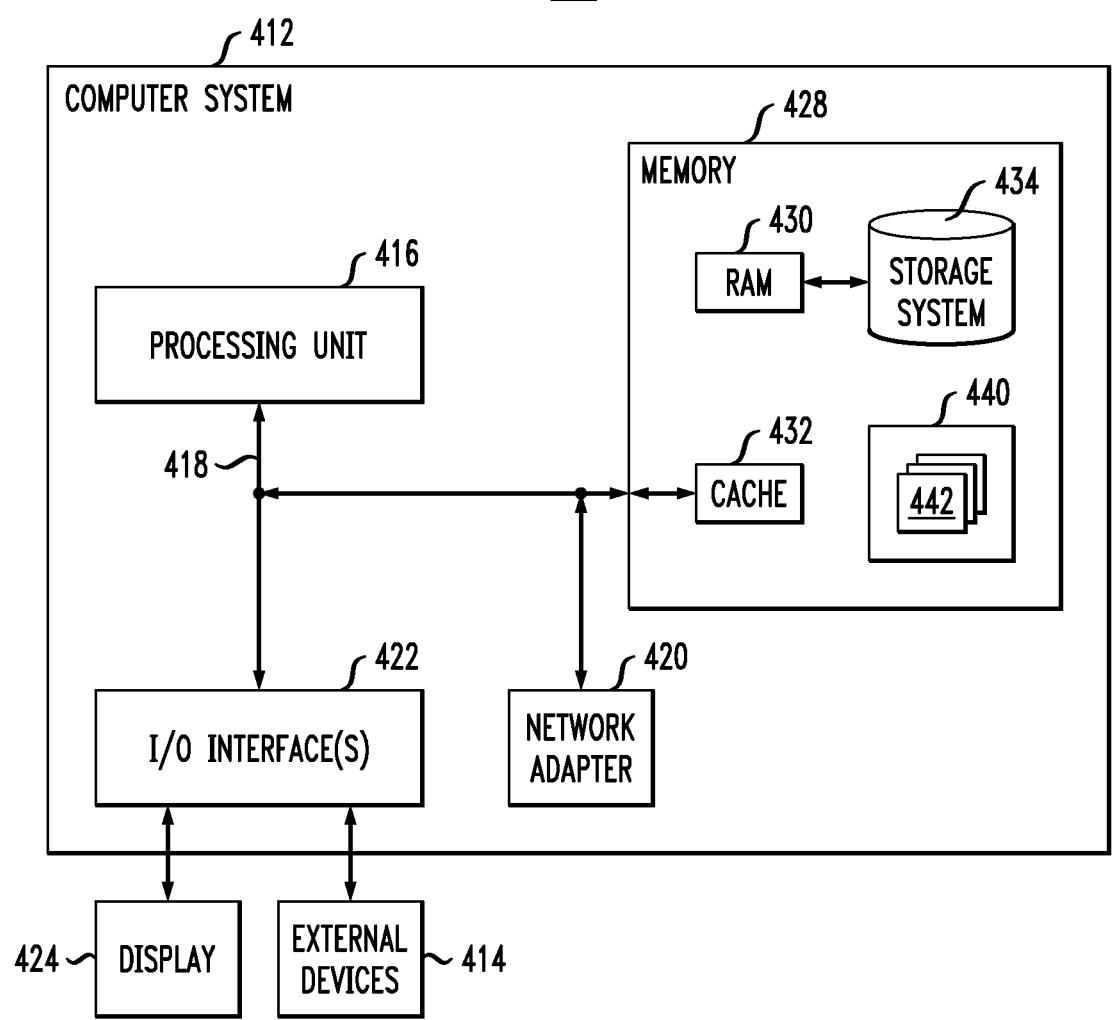
FIG. 4 depicts a computer system in accordance with which one or more components/steps of techniques of the invention may be implemented, according to an embodiment of the invention.

One or more embodiments can make use of software running on a computer or workstation. With reference to FIG. 4, in a computing node 410 there is a system/server 412, which is operational with numerous other general purpose or special purpose computing system environments or configurations. Examples of well-known computing systems, environments, and/or configurations that may be suitable for use with system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

System/server 412 may be described in the general context of computer system executable instructions, such as program modules, being executed by a computer system. Generally, program modules may include routines, programs, objects, components, logic, data structures, and so on that perform particular tasks or implement particular abstract data types. System/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, system/server 412 is shown in the form of a computing device. The components of system/server 412 may include, but are not limited to, one or more processors or processing units 416, system memory 428, and bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 412 typically includes a variety of computer system readable media. Such media may be any available media that is accessible by system/server 412, and it includes both volatile and non-volatile media, removable and non-removable media.

The system memory 428 can include computer system readable media in the form of volatile memory, such as random access memory (RAM) 430 and/or cache memory 432. System/server 412 may further include other removable/non-removable, volatile/nonvolatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces.

As depicted and described herein, memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

System/server 412 may also communicate with one or more external devices 414 such as a keyboard, a pointing device, an external data storage device (e.g., a USB drive), display 424, one or more devices that enable a user to interact with system/server 412, and/or any devices (e.g., network card, modem, etc.) that enable system/server 412 to communicate with one or more other computing devices. Such communication can occur via I/O interfaces 422. Still yet, system/server 412 can communicate with one or more networks such as a LAN, a general WAN, and/or a public network (e.g., the Internet) via network adapter 420. As depicted, network adapter 420 communicates with the other components of system/server 412 via bus 418. It should be understood that although not shown, other hardware and/or software components could be used in conjunction with system/server 412. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
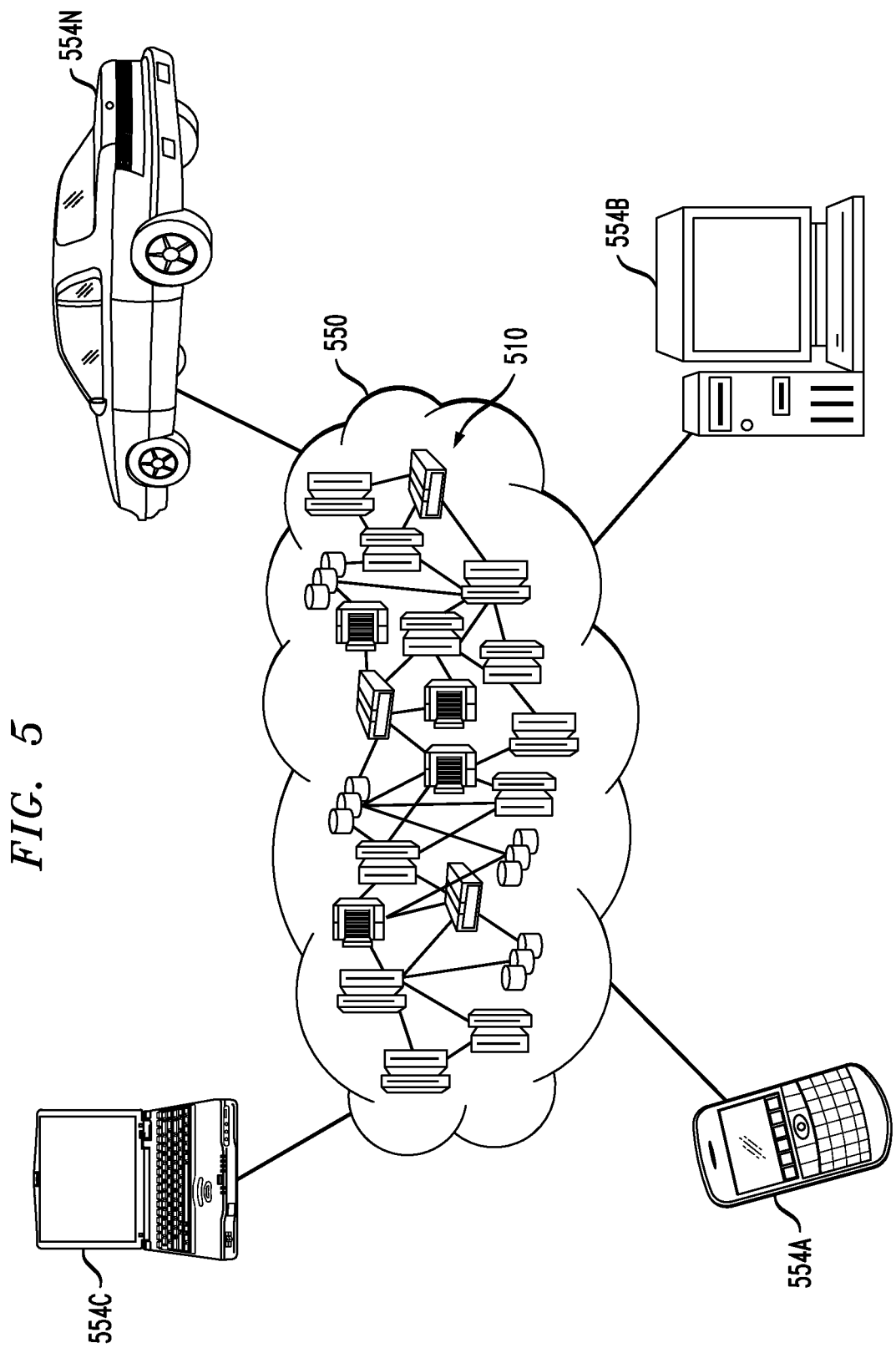
FIG. 5 depicts a cloud computing environment, according to an embodiment of the invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
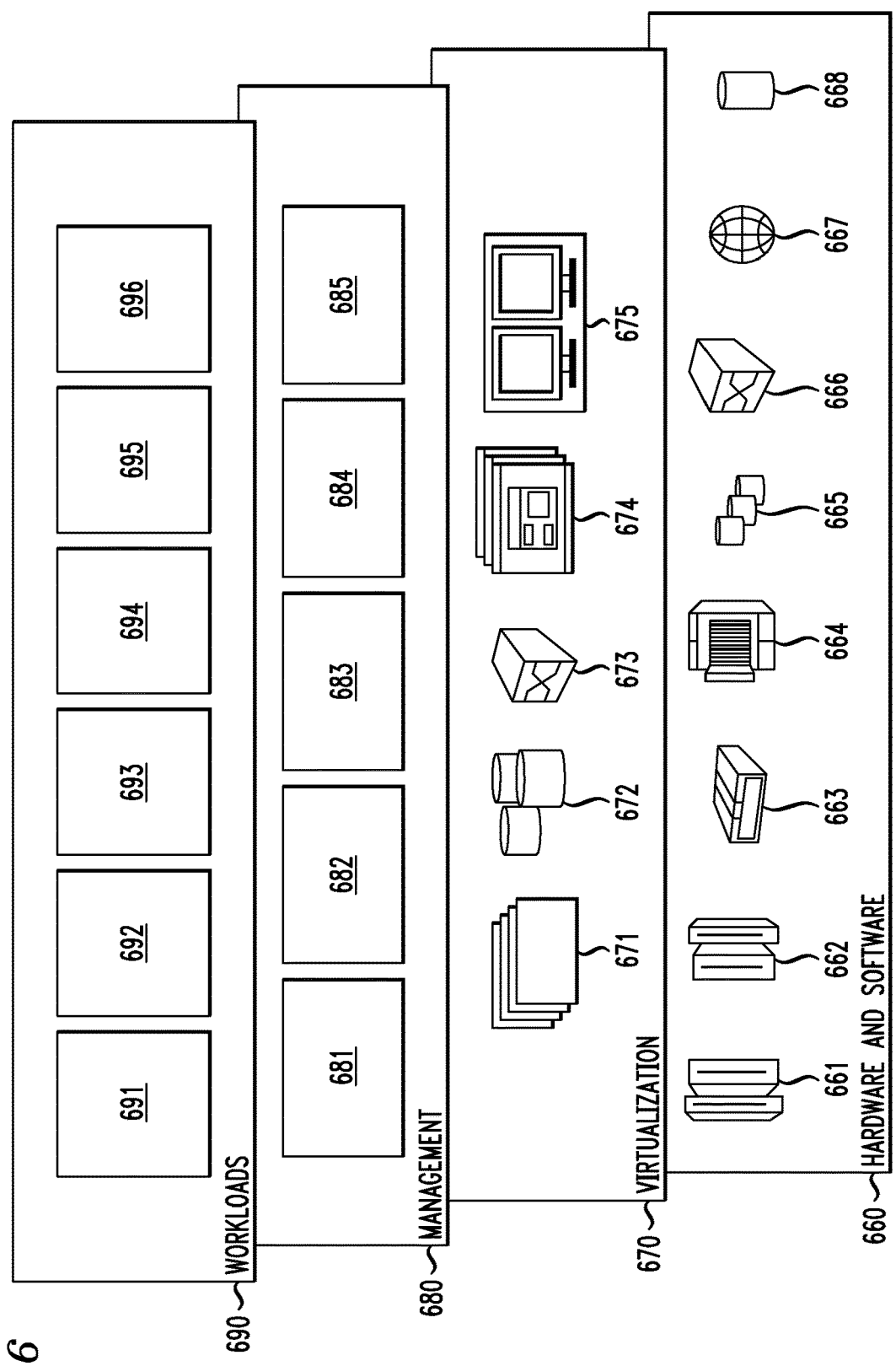
FIG. 6 depicts abstraction model layers, according to an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: social network activity data capture 691; content provider data capture 692; data analytics processing 693; graph creation support 694; data correlation support 695; and user validation support 696, which may perform various functions described above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method comprising:
   obtaining, by at least one processing device comprising a processor coupled to a memory, social network activity data from at least one social network;
   analyzing, by the at least one processing device, the obtained social network activity data comprising performing a natural language processing analysis of the obtained social network activity;
   identifying, by the at least one processing device, a plurality of users involved with content associated with a content provider based at least in part on the analysis;
   determining, by the at least one processing device, whether or not respective ones of the plurality of users are potential unauthorized consumers of the content based at least in part on the analysis;
   accessing, by the at least one processing device, social network activity data of a given user determined to be a potential unauthorized consumer of the content;
   accessing, by the at least one processing device, social network activity data of one or more other users of the plurality of users determined to be authorized consumers of the content based at least in part on the analysis, the one or more other users determined to be authorized consumers of the content having interactions with the given user on the at least one social network;
   analyzing, by the at least one processing device, the interactions between the given user and the one or more other users on the at least one social network to determine a probability that the given user is connected with at least one of the one or more other users determined to be authorized consumers of the content;
   wherein determining the probability that the given user is connected with at least one of the one or more other users determined to be authorized consumers of the content comprises:
     identifying a time at which the content is accessed by the given user;
     identifying a geo-location of the given user at the time at which the content is accessed by the given user; and
     determining whether the geo-location of the given user at the time at which the content is accessed by the given user matches a geo-location of said at least one of the one or more other users at the time at which the content is accessed by the given user;
   determining, by the at least one processing device, that the given user is an unauthorized consumer of the content based at least in part on the determined probability that the given user is connected with said at least one of the one or more other users determined to be authorized consumers of the content;
   in response to determining that the given user is an unauthorized consumer of the content, sending, by the at least one processing device, a notification to the given user with an incentive to consume the content in an authorized manner.

2. The method of claim 1, wherein the obtained social network activity data comprises communications sent between the given user and the one or more other users.

3. The method of claim 1, further comprising determining one or more social network interactions referring to the content.

4. The method of claim 1, wherein performing the natural language processing analysis comprises utilizing one or more of a classifier and a relation extractor.

5. The method of claim 1, further comprising creating a graph for the at least one social network, wherein creating the graph comprises:
   creating nodes representing users of the at least one social network; and creating one or more edges between the nodes representing respective connections between the users.

6. The method of claim 1, wherein determining that the given user is an unauthorized consumer of the content is further based at least in part on determining a degree of confidence for the given user based on two or more confidence scores associated with the given user.

7. The method of claim 6, wherein determining the degree of confidence comprises comparing the two or more confidence scores to at least one threshold.

8. The method of claim 6, wherein the two or more confidence scores comprise at least two of:
a score associated with the user profile of the given user mapping to the content provider;
a score associated with the analysis on social network activity associated with the given user;
a score associated with a likelihood of the given user to meet with the one or more other users of the at least one social network who can be mapped to the content provider; and
a score associated with a confidence that the user can meet with the one or more other users in person.

9. The method of claim 1, wherein determining whether or not respective ones of the plurality of users are potential unauthorized consumers of the content comprises:
generating a first subset of the plurality of users by removing any of the plurality of users who have a valid account with the content provider;
generating a second subset of the plurality of users by removing, from the first subset of the plurality of users, any of the users having contact data that maps to data associated with the content provider; and
generating a third subset of the plurality of users by removing, from the second subset of the plurality of users, any of the users determined to have a likelihood to consume the content with at least one of the one or more other users of the at least one social network authorized to consume the content.

10. The method of claim 9, wherein the contact data for the given user is aggregated from multiple social networks.

11. The method of claim 9, wherein removing a given user from the second subset comprises one or more of:
determining that the at least one other user of the at least one social network is associated with the social network activity data associated with the given user in the second subset; and
determining a likelihood of the given user in the second subset to meet the at least one other user of the at least one social network based on the social network activity data associated with the given user in the second subset.

12. The method of claim 11, wherein determining the likelihood of the given user in the second subset to meet the at least one other user of the at least one social network comprises determining whether the given user in the second subset and the at least one other user of the at least one social network have a personal connection or a professional connection in the at least one social network.

13. The method of claim 11, wherein determining the likelihood of the given user in the second subset to meet the at least one other user of the at least one social network comprises further comprises assigning a weight based upon a strength of connection between the given user in the second subset and the at least one other user of the at least one social network.

14. The method of claim 1, further comprising quantifying, by the at least one processing device, an amount of unauthorized consumption of the content.

15. The method of claim 1, further comprising generating, by the at least one processing device, a prediction model and utilizing, by the at least one processing device, the prediction model to predict future unauthorized consumption of the content.

16. The method of claim 1, wherein the notification includes an offer to obtain authorized access to the content from the content provider at a reduced price.

17. An article of manufacture comprising a computer-readable storage medium storing computer-readable program code which, when executed by a processor, causes the processor to perform the steps of:
obtaining social network activity data from at least one social network;
analyzing the obtained social network activity data;
identifying a plurality of users involved with content associated with a content provider based at least in part on the analysis;
determining whether or not respective ones of the plurality of users are potential unauthorized consumers of the content based at least in part on the analysis;
accessing social network activity data of a given user determined to be a potential unauthorized consumer of the content;
accessing social network activity data of one or more other users of the plurality of users determined to be authorized consumers of the content based at least in part on the analysis, the one or more other users determined to be authorized consumers of the content having interactions with the given user on the at least one social network;
analyzing the interactions between the given user and the one or more other users on the at least one social network to determine a probability that the given user is connected with at least one of the one or more other users determined to be authorized consumers of the content;
wherein determining the probability that the given user is connected with at least one of the one or more other users determined to be authorized consumers of the content comprises:
identifying a time at which the content is accessed by the given user;
identifying a geo-location of the given user at the time at which the content is accessed by the given user; and
determining whether the geo-location of the given user at the time at which the content is accessed by the given user matches a geo-location of said at least one of the one or more other users at the time at which the content is accessed by the given user;
determining that the given user is an unauthorized consumer of the content based at least in part on the determined probability that the given user is connected with said at least one of the one or more other users determined to be authorized consumers of the content;
in response to determining that the given user is an unauthorized consumer of the content, sending a notification to the given user with an incentive to consume the content in an authorized manner.

18. An apparatus comprising:
at least one processing device comprising a processor operatively coupled to a memory comprising computer-readable program code, wherein the at least one processing device is configured to execute the computer-readable program code to perform the steps of:

obtaining social network activity data from at least one social network;

analyzing the obtained social network activity data;

identifying a plurality of users involved with content associated with a content provider based at least in part on the analysis;

determining whether or not respective ones of the plurality of users are potential unauthorized consumers of the content based at least in part on the analysis;

accessing social network activity data of a given user determined to be a potential unauthorized consumer of the content;

accessing social network activity data of one or more other users of the plurality of users determined to be authorized consumers of the content based at least in part on the analysis, the one or more other users determined to be authorized consumers of the content having interactions with the given user on the at least one social network;

analyzing the interactions between the given user and the one or more other users on the at least one social network to determine a probability that the given user is connected with at least one of the one or more other users determined to be authorized consumers of the content;

wherein determining the probability that the given user is connected with at least one of the one or more other users determined to be authorized consumers of the content comprises:

identifying a time at which the content is accessed by the given user;

identifying a geo-location of the given user at the time at which the content is accessed by the given user; and determining whether the geo-location of the given user at the time at which the content is accessed by the given user matches a geo-location of said at least one of the one or more other users at the time at which the content is accessed by the given user;

determining that the given user is an unauthorized consumer of the content based at least in part on the determined probability that the given user is connected with said at least one of the one or more other users determined to be authorized consumers of the content;

in response to determining that the given user is an unauthorized consumer of the content, sending a notification to the given user with an incentive to consume the content in an authorized manner.

19. The article of manufacture of claim 17, wherein sending the notification to the given user with the incentive to consume the content includes an offer of authorized access to the content from the content provider at a reduced price.

20. The apparatus of claim 18, wherein sending the notification to the given user with the incentive to consume the content includes an offer of authorized access to the content from the content provider at a reduced price.

\* \* \* \* \*